Dec. 22, 1959   R. V. JOINER   2,918,378
FOOD PACKAGE AND METHOD OF PACKAGING
Filed Nov. 5, 1956
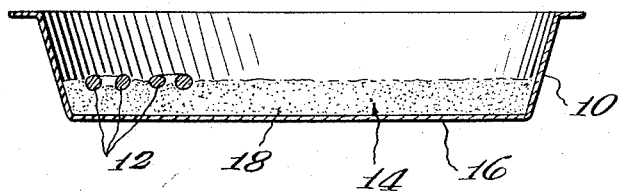
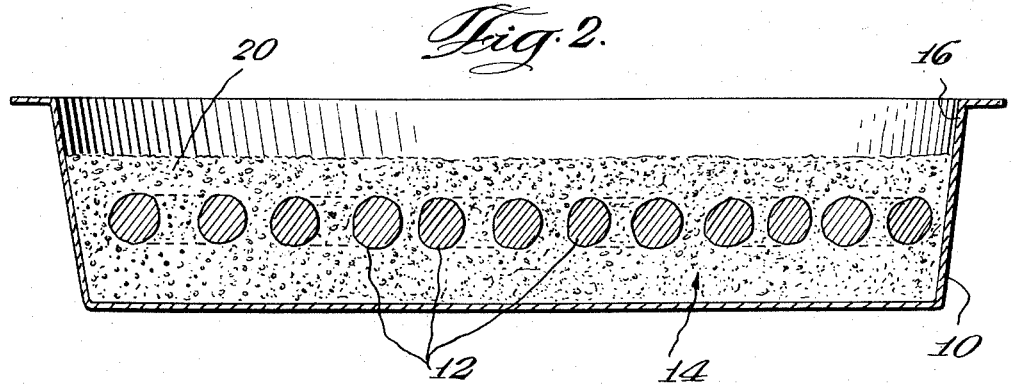
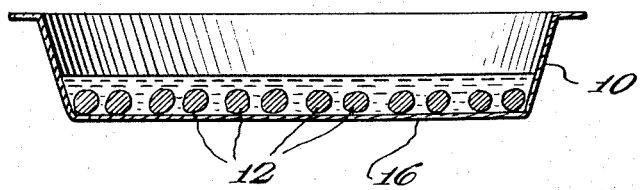
INVENTOR.
Richard V. Joiner
BY
Silverman + Mullin
Attorneys

United States Patent Office 2,918,378
Patented Dec. 22, 1959

2,918,378

FOOD PACKAGE AND METHOD OF PACKAGING

Richard V. Joiner, Chicago, Ill.

Application November 5, 1956, Serial No. 620,318

2 Claims. (Cl. 99—171)

This invention relates generally to preservation of food products and more particularly, relates to a novel method for preserving a frozen or refrigerated food product which is subsequently to be cooked and novel means for preserving such food products in containers of the type in which the food can be cooked.

It has been known to package frozen or refrigerated foods in aluminum foil containers or vessels together with a shortening or fat so that the food could be cooked directly in the container. The practice has been to line the bottom of the container with a small quantity of the shortening in its normally prepared state and seal the container with the food disposed on the bed of shortening. This type of packaging depended on the security of the seal and prolonged refrigeration to prevent deterioration or contamination of the food product. Many disadvantages of this type of food processing has resulted in substantial public disfavor for certain food products, in particular, frozen doughnuts. One disadvantage has been the difficulty to keep the food product properly frozen or refrigerated while it remained on unloading platforms at stores and while the food was transported from the store by the purchaser. Another disadvantage arose in connection with rupturing of the seal of the container where the container was mishandled whereby the food product was exposed to air which caused deterioration and dehydration thereof.

This type of food processing did not provide for packaging with the food product a sufficient amount of shortening for preparing the food in the case of certain products which required larger amounts of shortening during cooking. This was particularly true in connection with food products which were deep-fried such as doughnuts, french fried shrimps and potatoes and the like. Because of the inability of manufacturers to insure the proper refrigeration of the container at all times and the proper sealing of the container until the time for cooking the food, frozen food packages with sufficient shortening for deep frying are generally not employed.

This invention departs radically from such prior practices for preserving and packaging of frozen and refrigerated foods by providing a novel method for preserving such foods and novel means for achieving superior preservation of foods in their containers whereby the disadvantages hereinabove recited are substantially eliminated.

A principal object of the invention is to provide a novel method for preserving a food product in the vessel or container in which same is to be cooked which comprises encasing the food in an envelope of shortening which has been foamed or aerated to a volume several times larger than its initial volume at the normally prepared state thereof and packing the food in the cooking container or vessel encased in said shortening envelope.

Another important object of the invention is to provide novel means for achieving improved preservation of frozen and refrigerated foods in their packages which comprises an envelope of foamed or aerated shortening disposed in the container for the food completely surrounding the food.

Another important object of the invention is to provide such an aerated shortening envelope which can be used in varying amounts so that when melted, will either completely cover the food, as for deep frying or in reduced amount, but still encasing the food, such that when melted will leave the food exposed so that the cook can watch the cooking progress and turn the food as desired.

Another object of the invention is to provide a novel method for preserving frozen or refrigerated foods in vessels or containers in which the food may be cooked which enables the food to be packed with the food and/or shortening seasoned and which insures that the food product so preserved will be cooked in fresh shortening.

Another object of the invention is to provide a method for preserving food of the character described which eliminates the need for the housewife to handle shortening, heat the shortening for cooking and wait for cooling of the shortening after cooking so that same may be replaced in the container therefor.

These and other objects of the invention will become apparent as the description thereof evolves. In order to contribute to a full understanding of the invention, same has been described in detail in the specification both in connection with the method and means comprising the same and illustrated in the companion drawing. In the drawings:

Fig. 1 is a sectional view taken vertically through a package or vessel having a food product stored therein and illustrating the initial step of the method embodying the invention.

Fig. 2 is a view similar to Fig. 1 and illustrating the concluding step of the method and the food preserving envelope achieved by the invention.

Fig. 3 is a view similar to Fig. 2, however, illustrating the aerated shortening envelope of Fig. 2 as melted.

Referring to the drawing, in each of the figures is shown a representative container or vessel 10 of the type in which the food may be cooked. Same may comprise a shallow vessel simulating a fry pan, albeit without the handle. Container 10 may be formed of any one of a large variety of suitable materials which will permit the food to be cooked directly therein, such a material as aluminum foil being widely used at present. Illustrated disposed in the container or vessel 10 is a food product 12. The invention permits preservation and packaging of a large variety of food products which are frozen or refrigerated and required or desired to be cooked, examples of which include fish, either breaded or uncoated, bakery products, such as doughnuts, potatoes, fowl and even onions. All of the food products enumerated are of the type which may be cooked by deep frying or broiling or ordinary surface frying in a suitable vegetable shortening or animal fat.

In practicing the invention, the food may be frozen or refrigerated either before or after it is encased in the aerated shortening or animal fat envelope. In the case of prepared foods such as those which are bread coated, the food is prepared before it is frozen or refrigerated. The processing of the food may be done by the packager employing the method of the invention or the food may be obtained from food processing plants ready for packaging, and hence, freezing or refrigerating of the food or preparing same in breaded or otherwise coated condition do not form a part of the invention.

The initial step of the invention is to prepare the shortening. For purposes of this description, the term shortening is intended to include both vegetable shortening and animal fat such as lard. In its initial state the shortening is a solid body which is substantially non-porous. The shortening is thoroughly aerated or foamed, as by whipping, until it assumes a bulk several times the original volume thereof. Various aerating or foaming techniques may be employed, it being desired to achieve a consistency for the shortening which is characterized as containing a great number of air pockets or cells and which is somewhat flexible. Such a state of the shortening after whipping or foaming thereof is intended to be illustrated generally at 14.

Referring to Fig. 1, the preferred procedure for packaging the food product comprises the initial step of lining the bottom 16 of the vessel with a layer 18 of foamed shortening and then placing the food 12 in the layer 18. At this time, the food may be counted so that the proper number of pieces are packaged. Then, a second layer 20 of shortening 14 is superimposed on the food completely encasing same in a foamed shortening envelope. The total amount of shortening employed will depend upon the manner in which the food is to be cooked. Accordingly, a greater quantity of foamed shortening is packed with the food for deep-frying so that when melted, the shortening may substantially cover the food. For surface frying or broiling, a lesser quantity of foamed shortening is used. Because of the expanded condition of foamed shortening, it is possible to completely encase the food in the foamed shortening envelope even where surface frying or broiling techniques are to be employed. Of course, the package may be suitably marked to indicate the particular cooking method to be employed corresponding to the amount of foamed shortening placed in the container or vessel initially.

As seen in Fig. 2, the food 12 is encased in the envelope 14 of foamed shortening, the level of the shortening being spaced from the lip of the vessel. Upon cooking the food in the vessel, the shortening will melt to provide a level of melted shortening lower than that of the level thereof shown in Fig. 2, this lower level being shown in Fig. 3 completely covering the food as preferred for deep-frying.

Although the invention need not be limited to packaging of frozen food products, it is believed that most satisfactory and beneficial results are obtained in connection with frozen or refrigerated foods. The foamed shortening envelope in effect hermetically seals the food and thermally insulates same to reduce thawing thereof when the container is on a loading dock at the store or being carried or handled by the purchaser. In the event the seal of the container is ruptured, the foamed shortening envelope prevents the food encased therein from coming in contact with the ambient atmosphere. Dehydration, contamination and absorption of odors and tastes from other foods, for instance, is entirely avoided. I have determined that a frozen or refrigerated food encased in the foamed shortening is preserved substantially in the same condition as when packaged without material changes in color, appearance, taste, moisture content or other characteristics of the food for longer periods of time than in the case of previously employed processes. Such superlative preservation results are achieved even when the container is not maintained under refrigeration conditions for periods of time during which previously packaged frozen foods would deteriorate.

In practicing the invention, the foot is frozen or refrigerated before being encased in the foamed or expanded shortening envelope. When cooking the food, the foamed shortening requires less time to melt than in its normal solid state and hence, the foamed shortening melts even before the food product is thawed out, thus insuring preferred cooking conditions.

The invention eliminates other prevalent objections to preparation of foods by deep frying or other frying techniques employing shortening. Because the food is already packaged with the suitable amount of shortening, the housewife no longer need keep an independent supply of shortening on hand for such foods. The housewife is assured that the shortening used to cook the food thus packaged and preserved is fresh at all times. Objections such as spooning sufficient quantities of solid shortening into a cooking vessel, waiting the lengthy time required to melt and heat the shortening in the cooking vessel and thereafter waiting for the shortening to cool, the objectionable odors and smoke from cooking shortening or animal fat are enitrely eliminated. Washing of cooking vessels is eliminated since the food may be packaged in a disposable aluminum foil container in which it may be cooked directly. The invention may therefore be instrumental in encouraging the freezing and packaging of certain foods which normally are or are preferred to be fried in a shortening because there will be eliminated the concern for such foods thawing out inadvertently with attendant adverse results.

Although the invention has been described in connection with a disposable aluminum foil container, it will be appreciated that the foamed shortening encased food may be wrapped in suitable wrapping from which it may be placed in the cooking vessel. Also, the food may thus be packaged and preserved in vessels in which same is not to be cooked, suitable quantities being removed by the housewife as she requires same. The versatile nature of the invention will enable the shortening to be seasoned as well. Also, it will be appreciated that since the food is entirely encased in the foamed shortening envelope, a certain amount of basting benefits are obtained as the shortening melts and slides over the food when dropping to the bottom of the container or vessel 10. This is particularly desirable in the case of broiling foods.

It is believed the invention has been described in sufficient detail to enable the skilled artisan to understand and practice the same. It is believed that minor variations in the steps of the method and the means for preserving the food embodying the invention may occur to the skilled artisan without sacrificing any of the advantages or departing from the scope of the invention, and hence, it is desired the claims hereto appended be construed in the broadest scope commensurate with the progress made in the arts and sciences by the invention.

I claim:

1. The method of packaging a refrigerated uncooked food product in a closed container intended to be maintained in a refrigerated atmosphere until the food is to be cooked comprising, substantially hermetically sealing said food in uncooked state in the interior of the package by means of a thermally insulative cooking medium consisting of an aerated cooking shortening expanded from a conventional cooking shortening to occupy a volume of space substantially greater than the volume occupied by the initial shortening prior to expansion thereof, said aerated shortening being introduced into the container to completely encase the food product as a flexible cellular mass with a portion of the said mass forming a bed for the food product, the quantity of aerated shortening introduced being selected to occupy a liquid level upon being melted in the container sufficient for permitting the food product to be fried.

2. In combination, a closed package formed of suitable material to permit cooking of a food product therein, an uncooked food product on the interior of the package, a thermally insulative cooking medium on the interior of the package having said food product encased therein to space the product from all interior surfaces of the package, said cooking medium consisting of an aerated shortening of flexible cellular mass occupying a volume of space greater than the volume of the initial shortening from which same is formed, the quantity of aerated shortening being selected to occupy a liquid level in the package when melted during cooking of the food sufficient for permitting the food product to be fried, the thickness of the aerated shortening between the bottom of the container and the food product being selected to form a bed for the food, said food package adapted to be refrigerated until the food is to be cooked, said aerated shortening permitting removal of the package from the refrigerated atmosphere for substantial periods of time without adverse affects to said food.

References Cited in the file of this patent

UNITED STATES PATENTS

| | | |
|---|---|---|
| 2,101,501 | Keck | Dec. 7, 1937 |
| 2,604,407 | Martin | July 22, 1952 |
| 2,648,610 | Martin | Aug. 11, 1953 |
| 2,673,806 | Colman | Mar. 30, 1954 |
| 2,674,536 | Fisher | Apr. 6, 1954 |

FOREIGN PATENTS

| | | |
|---|---|---|
| 646,499 | Great Britain | Nov. 22, 1950 |

OTHER REFERENCES

"Food Industries," July 1948, page 126, article entitled "Wife-Saving Meals in Aluminum Foil Bags."

"Food Industries," October 1948, pages 84 to 87, inclusive, article entitled "Frozen Dinners."